(12) United States Patent
Mackowski et al.

(10) Patent No.: US 7,993,612 B2
(45) Date of Patent: Aug. 9, 2011

(54) RECOVERY OF RARE EARTH ELEMENTS

(75) Inventors: Steven John Mackowski, Jandakot (AU); Raul Raiter, Dianella (AU); Karin Helene Soldenhoff, Earlwood (AU); Elizabeth Margaret Ho, Kensington (AU)

(73) Assignee: Arafura Resources Limited, Perth (AU)

( * ) Notice: Subject to any disclaimer, the term of this patent is extended or adjusted under 35 U.S.C. 154(b) by 673 days.

(21) Appl. No.: 12/119,964

(22) Filed: May 13, 2008

(65) Prior Publication Data

US 2009/0272230 A1 Nov. 5, 2009

(30) Foreign Application Priority Data

May 2, 2008 (AU) .................................. 2008201945

(51) Int. Cl.
*C01F 17/00* (2006.01)
(52) U.S. Cl. ..... 423/21.1; 423/20; 423/21.5; 423/150.1; 423/263
(58) Field of Classification Search ............ 423/20, 423/21.1, 21.5, 150.1, 263
See application file for complete search history.

(56) References Cited

U.S. PATENT DOCUMENTS

| 5,011,665 | A | * | 4/1991 | Cailly et al. | 423/21.5 |
| 5,531,970 | A | * | 7/1996 | Carlson | 423/3 |
| 2009/0078087 | A1 | * | 3/2009 | Heidenfelder et al. | 75/743 |

FOREIGN PATENT DOCUMENTS

RU 2104941 * 2/1998

* cited by examiner

*Primary Examiner* — Steven Bos
(74) *Attorney, Agent, or Firm* — Harness, Dickey & Pierce, P.L.C.

(57) ABSTRACT

A process for recovering rare earth elements from a composite ore containing rare earth elements that includes a monazite group mineral and an apatite mineral, includes pre-leaching the composite ore with an acid so as to substantially dissolve the apatite mineral into the leach liquor and precipitating rare earth elements from the pre-leach liquor. The residue of the pre-leaching step is subjected to an acid bake treatment, followed by a water leach, to produce a water leach liquor rich in rare earth elements. Impurities including thorium and iron are separated from the water leach liquor by introducing a neutralizing additive to the water leach liquor rich in rare earth elements, and rare earth elements are precipitated from the post-neutralization liquor.

38 Claims, No Drawings

RECOVERY OF RARE EARTH ELEMENTS

CROSS-REFERENCE TO RELATED APPLICATIONS

This application claims the benefit of Australian Patent Application Serial Number 2008201945, filed May 2, 2008. The disclosure of the above application is incorporated herein by reference.

FIELD

The present disclosure relates generally to the recovery of rare earth elements from ores containing the elements. More particularly, the invention is concerned with recovering rare earth elements from a composite ore containing rare earth elements that includes a monazite group mineral and an apatite mineral.

BACKGROUND

The statements in this section merely provide background information related to the present disclosure and may not constitute prior art.

Rare earth elements are of increasing economic importance as the highly specialized properties of individual elements find applications in a wide range of pervasive products. For example, lanthanum is a component of catalysts employed in oil refineries, neodymium is a component of solid state lasers, neodymium magnets are widely employed in headphones, hard disk drives, and DVD and CD-ROM drives, and europium and terbium are dopants in primary color phosphors for plasma and LCD screens.

At present, the principal source of most rare earth elements is China, and the principal deposits are in the Sichuan and Baotou regions.

With limited prospects for expanded production, and diversion of an increasing proportion to domestic customers, China is unlikely to be able to meet the expected increase in world demand for rare earth elements over the coming years. Since the gap will not be met by traditional sources outside China, such as monazite deposits for certain of the elements, there is a growing requirement to tap non-traditional ores containing rare earth elements. One of these is a composite ore containing rare earth elements that includes a monazite group mineral and an apatite mineral. Apatite is a phosphate of calcium, while a "monazite group mineral" is a composite monoclinic phosphate of rare earth elements and several other substituents.

When a composite ore of this structure has been subjected to conventional or other known processing regimes, it has proven difficult to convert the ore to an economically useful deposit. High thorium content in both principal components of the ore have proven a hurdle to economic conversion of the phosphate base of the apatite to a "clean" fertilizer product, while the uranium content associated with the thorium cannot be economically extracted in sufficiently pure form.

Primary treatments that were attempted included a nitric acid leach, a hydrochloric acid leach, a sulphuric acid bake/water leach and a caustic crack. It was found that direct treatment of the ore resulted in either low rare earth recovery, or poor leach selectivity for rare earths over calcium and phosphorous.

It is an object of the invention to provide a process for recovering rare earth elements from composite ores containing rare earth elements that include a monazite group mineral and an apatite mineral, preferably in a manner that also permits economic extraction of the phosphate values of the ore and removal of thorium to an extent that can meet end-product specifications.

DESCRIPTION OF THE INVENTION

The invention provides, in a first aspect, a process for recovering rare earth elements from a composite ore containing rare earth elements that includes a monazite group mineral and an apatite mineral, including:

pre-leaching the composite ore with an acid so as to substantially dissolve the apatite mineral into the leach liquor;

precipitating rare earth elements from the pre-leach liquor;

subjecting the residue of the pre-leaching step to an acid bake treatment, followed by a water leach, to produce a water leach liquor rich in rare earth elements;

separating impurities including thorium and iron from the water leach liquor by introducing a neutralizing additive to said water leach liquor rich in rare earth elements; and precipitating rare earth elements from the post-neutralization liquor.

It is found that the acid pre-leach is effective in achieving sufficient dissolution of the calcium phosphate lattice of the apatite to allow rare earth elements to report to both the leach liquor and the solid residue.

The acid employed for the pre-leach is preferably nitric or hydrochloric acid, more preferably the latter.

Preferably, rare earth elements are precipitated from the pre-leach liquor as phosphates.

Precipitation of rare earth elements as phosphates from the pre-leach liquor is conveniently by addition of ammonia or hydrated lime. Advantageously, precipitation conditions are selected to recover, with the rare earth elements and in a form separable subsequently, a major proportion of thorium present in the pre-leach liquor from the composite ore.

Preferably, especially where the apatite is a fluorapatite, a fluoride component of the pre-leach liquor is removed, e.g. by addition of a sodium salt to cause precipitation of $Na_2SiF_6$. Silicon is typically sufficiently present in the composite ore to allow this precipitation. The sodium salt conveniently matches the acid employed for the pre-leach, for example NaCl in the case of a hydrochloric acid pre-leach or $NaNO_3$ with a nitric acid pre-leach. The sodium salt is typically required to stoichiometric excess, e.g. 7 to 8 times. Recovery of the fluoride component is substantially more effective when the pre-leach acid was hydrochloric.

The acid bake is preferably carried out in a rotary kiln, and is preferably effected for between 1 and 3 hours, most preferably 1.5 to 2.5 hours.

The acid bake treatment is preferably a sulphuric acid bake, and typically at a temperature in the range 200-280° C., more preferably 210-250° C., most preferably about 230° C.

Preferably the thorium and iron separation is effected by neutralization with a suitable alkali or alkaline earth additive selected to minimize rare earth co-precipitation or absorption. A calcium compound is thought to be unsuitable for the latter purpose. A magnesium compound such as magnesium oxide or magnesium carbonate is satisfactory and may be preferred.

The pH of the liquor following addition of the neutralization additive is preferably in the range 2 to 3.5, most preferably about 2.5. This pH is thought to be optimum for maximum thorium and iron removal whilst minimizing rare earth loss to the solid residue of the neutralization step.

It is found that a minimum Fe:P molar ratio of 1, preferably an Fe:P molar ratio substantially equal to 1, in the water leach liquor feeding the neutralization is desirable in order to minimize rare earth loss to the solid residue by premature precipitation of rare earth phosphates. Hence, it is preferred if necessary to add Fe upstream of the neutralization step, e.g. to the acid bake, in order to optimize thorium and iron removal with minimal rare earth element loss to the solid residue of the neutralization step. Preferably, thorium removal is optimized to ensure an acceptable thorium level in the downstream rare earth end-product.

The precipitation of the rare earth elements from the post-neutralization liquor is preferably by carbonate or double salt precipitation. The resultant composite rare earth carbonates or hydroxides may be leached to produce a composite rare earth chloride as an end-product with acceptable impurity levels. The leach may be particularly desirable to remove aluminum from the composite rare earth carbonate.

With carbonate precipitation, 110% stoichiometric addition of a carbonate is preferred.

In an embodiment, the rare earth phosphates precipitated from the pre-leach liquor are subjected to said acid bake together with the pre-leach residue. Alternatively, the rare earth phosphates precipitated from the pre-leach liquor are separately treated by an acid bake or by a caustic conversion process to permit recovery of rare earth elements therefrom.

Preferably, the pre-leach acid addition is about 110% stoichiometric with respect to calcium. As mentioned, apatite is a phosphate of calcium and calcium may also be a significant substituent in the monazite group mineral, for example where it is cheralite. This level of acid addition with respect to calcium optimizes calcium removal by subsequent precipitation from the liquor, for example by crystallization as calcium nitrate.

The initial concentration of the nitric acid pre-leach is preferably in the range 30 to 60 wt %, more preferably in the range 40 to 50 wt %. The initial concentration of the hydrochloric acid pre-leach is preferably in the range 10 to 40 wt %, more preferably in the range 20 to 30 wt %.

EXAMPLES

A composite ore from Nolan's Bore in the Northern Territory of Australia was subjected to a series of processing tests according to the invention. Rare earths in the ore were present in cheralite, (LREE, Ca)(P,Si)O$_4$, which is a monazite group mineral, in association with fluorapatite, Ca$_5$(PO$_4$)$_3$ (F,OH). The main ore resource consists of about 82% w/w fluorapatite and 13% w/w cheralite. The remainder of the ore is about 3 to 4% clay with some calcite, dolomite, quartz and other minor minerals. Rare earths substitute for the calcium in the apatite structure. However, the bulk of the rare earths and thorium in the ore is contained in the cheralite, which is isomorphous with monazite. SEM examination suggested that approximately 67% of the rare earths are associated with the cheralite and 33% are associated with the apatite. Two assays of the composition of the ore, determined by XRF, are set out in Table 1.

Samples of the ore, riffled and ground to P80=180 μm, were subjected respectively to nitric acid and hydrochloric acid pre-leach treatments. The details and results of these treatments are set out respectively in Table 2 and Table 3. In the nitric acid pre-leach (Table 2), Ca and P extractions of 97% and 94% respectively were obtained. Rare earth dissolution of 40% can be expected. A rare earth residue concentrate containing <3% Ca and P, and 11% rare earths was produced. Similar results were obtained by hydrochloric acid pre-leaching (Table 3).

In the example reported in Table 2, the initial HNO$_3$ concentration is 54 wt %. Further calculations and experiments have indicated that the broadly preferred initial HNO$_3$ concentration is 30 to 60 wt %, but it is more preferably in the range 40 to 50 wt %. The corresponding figures for the hydrochloric acid pre-leach are 10 to 40 wt % and 20 to 30 wt %.

The pre-leach liquors were treated by addition of ammonia to successfully precipitate rare earth phosphates. The details of the treatments and the results are set out in Tables 4 and 5. Rare earth recoveries of 89% and 98% were obtained from the nitrate and chloride liquors respectively.

Four samples of solid residue from the hydrochloric acid pre-leach were subjected to a sulphuric acid bake in a rotary kiln, under standard conditions of 750 kg/lt H$_2$SO$_4$ addition and a temperature of 230° C. for 2 hours. Rare earth recovery was consistently about 96%. It had previously been ascertained, in smaller sample tests in a static furnace that rare earth recovery fell from 90-92% at 230° C. to less than 80% at 200° C., and was not improved by increasing the temperature from 250° C. to 300° C. As earlier foreshadowed, an Fe:P ratio of about 1 is thought to be required for an optimum neutralization step, so bakes of pre-leach residue at temperatures above 250° C. are preferably avoided since they were found to reduce Fe dissolution.

In the smaller sample tests, a bake time of 2 h was found to be optimum; at a bake time of 0.5 h, rare earth recovery was significantly lower.

The solid residue of each acid bake test was water leached to produce a water leach liquor rich in rare earth elements. Waste solids were removed: these were found by SEM and XRD analysis to contain very little rare earth remnant and to consist mainly of quartz, alkali feldspar and remnant silicates, surrounded by clays and micas. The liquor was subjected to a standard solvent extraction procedure to remove uranium values, e.g. employing a tertiary amine as solvent.

Neutralization of the water leach bake liquor was then carried out as a purification step to selectively precipitate thorium, iron and aluminum from the rare earths. This was effected at room temperature using 20 wt % slurries of the neutralizing additive, magnesia or magnesium carbonate. It was found that calcium carbonate and lime were less effective neutralizing agents due to much higher rare earth losses, possibly due to co-precipitation/adsorption with gypsum due to the added calcium.

By testing, it was further found that a minimum Fe:P molar ratio of above 1, preferably about 1, was desirable in the water leach liquor feeding the neutralization in order to prevent rare earth loss to the solid residue by premature precipitation of rare earth phosphates. It is thought that as the pH increases, iron phosphate precipitates. If there is not enough iron to react with the phosphate in the first instance, then the phosphate will combine with rare earths and precipitate as rare earth phosphate. The Nolan's Bore feed to the acid bake has a molar ratio Fe:P=0.6, and therefore some iron addition to the acid bake or water leach liquor would be desirable in order to minimize rare earth losses in the neutralization step.

The results of a variety of neutralization tests are set out in Table 6.

Post-neutralization liquor samples were now treated with ammonium carbonate to precipitate a composite rare earth carbonate, a commercial end product suitable for further processing by known techniques to separate out the rare earth components.

The composition of the composite rare earth carbonate is set out in Table 7. One optional further treatment, especially for the purpose of further reducing the aluminum and thorium content, is to leach this carbonate with hydrochloric acid to produce a rare earth chloride end-product.

The earlier mentioned rare earth phosphates precipitated from the pre-leach liquor were split into samples. Some were successfully treated in a process stream similar to that outlined above for the pre-leach residue, but other processing options may be more useful in extracting the rare earths from the phosphates.

TABLE 1

Analysis of Nolan's Bore High Grade Ore (%)

| Component (%) | XRF Assay |
|---|---|
| Al | 1.9 |
| Ba | 0.051 |
| Ca | 26 |
| Ce | 2.7 |
| F | 0.9 |
| Fe | 1.7 |
| La | 1.1 |
| Nd | 1.3 |
| P | 12 |
| Pr | 0.45 |
| Si | 7.8 |
| Sm | 0.16 |
| Sr | 0.45 |
| RE (La—Sm) | 5.7 |
| Th (XRF) | 0.55 |
| Th (NAA) | 0.53 (21.6 Bq/g) |
| U (XRF) | 0.049 (6.0 Bq/g) |
| U (DNA) | 0.034 |
| Y | 0.10 |

TABLE 2

$HNO_3$ Pre-Leach of Nolan's Bore Ore - 54% w/w $HNO_3$
880 kg/t $HNO_3$, uncontrolled temperature
Leach Conditions

| | |
|---|---|
| Initial Wet Mass Ore (g) = | 282.5 |
| Initial Dry Mass Ore (g) = | 250.2 |
| % Moisture = | 11.4 |
| Entrained water = | 32.3 |
| Added water (mL) = | 56.5 |
| $HNO_3$ volume (mL) = | 225.06 |
| $HNO_3$ concentration (g/L) = | 979.8 (69% w/w) |
| Density of Conc. $HNO_3$ (g/mL) = | 1.42 (69% w/w) |
| Initial wt % solids = | 38 |
| $HNO_3$ (kg/ton dry ore) = | 881 |
| $HNO_3$ concentration initially = | 54.0% w/w or ~11M |
| Leach temp range (° C.) = | 22-60° C. (uncontrolled) |

Comments:
Dispensed acid into slurry at 10 mL/min, no temp. control.
No precipitate formed in pregnant liquor after filtration
2 blade, pitched impeller, baffled, glass leach vessel.
Stirring ok. A lighter, foamy layer formed on the top of the slurry but raising the agitator resulted in better mixing.

| | | Liquor Analyses (mg/L) | Solid Analysis (wt %) | % Dissolution | |
|---|---|---|---|---|---|
| Element | Sample wt % | 2 h | Final Residue 2 h | Liquid Final | Solid Final |
| Al | 1.83 | 2880 | 4.83 | 21 | 24 |
| Ca | 25.1 | 170000 | 2.93 | 90 | 97 |
| Ce | 2.66 | 7190 | 5.34 | 35 | 42 |
| F | 0.9 | | 0.60 | | 81 |
| Fe | 1.59 | 2180 | 4.56 | 18 | 18 |
| La | 1.06 | 2262 | 2.52 | 28 | 32 |
| Nd | 1.27 | 3329 | 2.40 | 35 | 46 |
| P | 11.44 | 77400 | 2.58 | 89 | 94 |
| Pr | 0.44 | 976 | 0.76 | 30 | 50 |
| Si | 7.61 | 3490 | 24.52 | 6 | 8 |
| Sm | 0.15 | 487 | 0.28 | 42 | 48 |
| Sr | 0.44 | 1810 | 0.37 | 55 | 76 |
| Th | 0.55 | 1480 | 0.99 | 33 | 48 |
| U (XRF) | 0.05 | 160 | 0.08 | 43 | 50 |
| Y | 0.10 | 272 | 0.11 | 38 | 67 |
| LREE (La—Sm) | 5.58 | 14245 | 11.30 | 34 | 42 |

TABLE 3

HCl Bulk Pre-Leach of Nolan's Bore Ore at 45° C.
510 kg/t HCl (~110% stoich. for Ca), 28 wt % initial solids
Leach Conditions

| | |
|---|---|
| Size distribution, $P_{80}$ = | 180 μm |
| Initial Wet Mass Ore (g) = | 1196 |
| | 490 |
| Initial Dry Mass Ore (g) = | 1401.5 |
| % Moisture = | 19.2 |
| | 11.1 |
| Entrained water (mL) = | 284.5 |
| Added water (mL) = | 1056.5 |
| HCl volume (mL) = | 1928 |
| HCl concentration (g/L) = | 371 (32% w/w) |
| Density of Conc. HCl (g/mL) = | 1.1594 (32% w/w) |
| Initial wt % solids = | 28 |
| HCl (kg/ton dry ore) = | 510 |
| HCl concentration initially = | 20.0% w/w |
| Leach temp range (° C.) = | not controlled (21-44° C.) |

Comments:
Concentrated HCl was added with a dosimate at a dose rate of 100 mL/min
Maximum temperature reached was 44° C. after addition of about 1664 mL HCl
A vacuum pump was used to pump gas at a slow rate from the head space over the slurry through a water trap for HF
Some white precipitate formed in the primary filtrate overnight
Density of P.F. was measured after filtering off white solid that precipitated
Mass of white solid that precipitated in the recovered P.F. was 1.4 g
White solid was washed with a small amount of water, dried in an oven and assayed by XRF
XRF assay of white solid: 25.4% Ca, 18.7% S, 1.2% Ba, 1.9% P: solid appears to be $CaSO_4$ (head contains 0.2% S)

| | | Liquor Analyses (mg/L) | Solid Analysis (wt %) | % Dissolution | |
|---|---|---|---|---|---|
| Element | Sample wt % | (before ppt) | Final Residue 2 h | Liquid Final | Solid Final |
| Al | 1.83 | 1650 | 4.77 | 22 | 20 |
| Ca | 25.1 | 102000 | 2.66 | 97 | 97 |
| Ce | 2.66 | 3530 | 6.01 | 34 | 31 |
| F | 0.9 | | 0.60 | | 80 |
| Fe | 1.59 | 1320 | 4.49 | 21 | 14 |
| La | 1.06 | 1214 | 2.68 | 29 | 23 |
| Nd | 1.27 | 1806 | 2.69 | 37 | 35 |
| P | 11.44 | 47600 | 2.86 | 104 | 92 |
| Pr | 0.44 | 423 | 0.94 | 27 | 35 |
| Si | 7.61 | 2740 | 23.58 | 16 | 5 |
| Sm | 0.15 | 312 | 0.33 | 53 | 34 |
| Sr | 0.44 | 1120 | 0.43 | 73 | 70 |
| Th | 0.55 | 408 | 1.46 | 24 | 18 |
| U (XRF) | 0.05 | 59 | 0.10 | 32 | 35 |
| Y | 0.10 | 170 | 0.12 | 45 | 62 |
| LREE (La—Sm) | 5.58 | 7286 | 12.64 | 34 | 31 |

TABLE 4

Rare Earth Precipitation with NH$_3$ from Nitric Acid Leach Liquor After Partial Ca and F Removal

| Precipitation conditions | |
|---|---|
| Volume Feed (mL) = | 100 |
| Temperature (° C.) = | 80° C. |
| Vol. of 25% NH$_3$ soln. added = | 30 |
| kg NH$_3$/kg (La—Sm) in solution = | 3.31 |
| Agitation time (min) = | 120 |
| pH in 1 + 13 dilution = | 1.70 |
| (1 + 13 = 1 mL sample in 13 mL D1 H$_2$O) | |
| Volume Primary Filtrate (mL) = | 86 |
| Wash Volume (mL) = | 211 |

| Precipitate | |
|---|---|
| Mass ppt dry (g) = | 5.99 |
| % Moisture = | 78 |
| Drying Temperature (° C.) = | 100 |
| S.G of 25% NH$_3$ solution = | 0.91 |

Comments:
Precipitate was slow to filter so attempted to flocculate repulp slurry (Magnafloc 333) but no flocs formed
Green precipitate

| | Assays | | | % Dissolution | |
|---|---|---|---|---|---|
| | Feed | ppt | Barren liquor | | |
| Element | mg/L | wt % | mg/L | Liquor | Solid |
| Al | 12700 | 0.86 | 10700 | | 4 |
| Ca | 68600 | 4.8 | 49800 | 6 | 4 |
| Ce | 10100 | 17.6 | 160 | 98 | 105 |
| F | | 2.2 | | | |
| Fe | 7340 | 1.5 | 6080 | | 12 |
| La | 3554 | 5.1 | 671 | 75 | 86 |
| Nd | 4975 | 7.7 | 642 | 83 | 93 |
| P | 148000 | 13.5 | 111000 | 3 | 5 |
| Pr | 1198 | 2.2 | 117 | 87 | 111 |
| Si | 3730 | 2.1 | 2130 | 26 | 34 |
| Sm | 792 | 1.01 | 128 | 79 | 77 |
| Sr | 1900 | 0.58 | 1360 | 7 | 18 |
| Th | 2140 | 3.7 | 236 | 86 | 105 |
| U | 300 | 0.02 | 177 | 23 | 4 |
| Y | 444 | 0.4 | 280 | 18 | 48 |
| SUM (La—Sm) | 20619 | 34 | 1719 | 89 | 98 |

TABLE 5

Rare Earth Precipitation with NH$_3$ from Hydrochloric Acid Leach Liquor

| Precipitation conditions | |
|---|---|
| Volume of Feed (mL) = | 150 |
| Temperature (° C.) = | 80 |
| Vol. of 25% NH$_3$ soln. added (mL) = | 15.01 |
| kg NH$_3$/kg (La—Sm) in solution = | 3.15 |
| Agitation time = | 120 |
| pH in 1 + 13 dilution = | 1.83 |
| (1 + 13 = 1 mL sample in 12 mL D1 H$_2$O) | |
| Volume Primary Filtrate (mL) = | 143 |
| Wash Volume (mL) = | 305 |

| Precipitate | |
|---|---|
| Mass ppt dry (g) = | 2.46 |
| Drying Temperature (° C.) = | 100 |
| S.G of 25% NH$_3$ solution = | 0.91 |

Comments:
High concentration of RE's in the wash indicates that the wash is redissolving some precipitated RE's i.e. Acid concentration in wash is too strong
% Precipitation based on liquor assumes no solution volume change

| | Assays | | | % Precipitation | |
|---|---|---|---|---|---|
| | Feed | Ppt | Liquor (2 h) | | |
| Element | mg/L | wt % | (mg/L) | Liquor | Solid |
| Al | 1650 | 0.75 | 956 | 36 | 7 |
| Ca | 101000 | 4.5 | 85800 | 7 | 1 |
| Ce | 3500 | 16.5 | 59 | 98 | 77 |
| F | | 3.4 | | | |
| Fe | 1410 | 1.01 | 889 | 31 | 12 |
| La | 1214 | 5.2 | 50 | 96 | 70 |
| Nd | 1796 | 8.3 | 37 | 98 | 76 |
| P | 47800 | 9.9 | 38400 | 12 | 3 |
| Pr | 423 | 2.1 | 4 | 99 | 81 |
| Si | 1880 | 3.5 | 903 | 47 | 30 |
| Sm | 286 | 1.08 | 8 | 97 | 62 |
| Sr | 1090 | 0.34 | 914 | 8 | 5 |
| Th | 457 | 2.5 | 7 | 98 | 91 |
| U | 59 | 0.02 | 49 | 8 | 4 |
| Y | 159 | 0.62 | 26 | 82 | 64 |
| SUM (La—Sm) | 7219 | 33.2 | 158 | 98 | 75 |

TABLE 6

Neutralization of Bake/Water Leach Liquor at Ambient Temperature
Neutralization Additive: MgO

| Test ID | Fe:P mole ratio | pH | % La—Sm Pptn | % Al Pptn | % Fe Pptn | % P Pptn | % Th Pptn |
|---|---|---|---|---|---|---|---|
| BN16 | 0.18 | 1.7 | 70 | 16 | 78 | 69 | 99 |
| BN17 | 1.04 | 1.7 | <3 | 0 | 92 | 91 | 96 |
| BN21 | 1.10 | 2.5 | 2 | 4 | 92 | 98 | 99 |
| BN23* | 1.07 | 2.4-2.5 | 2 | 9 | 92 | 97 | 99 |
| BN13 | 0.43 | 3 | 60 | 46 | 95 | 97 | 97 |
| BN20 | 1.06 | 3 | <5 | 30 | 93 | 98 | 99 |
| BN22** | 1.05 | 2.9-3.0 | <5 | 20 | 94 | 98 | 99 |
| BN19 | 0.73 | 3.4-3.0 | <5 | 41 | 90 | 91 | 99 |
| BN18 | 1.04 | 3.4 | <5 | 67 | 99.7 | 99.6 | 99.7 |

*MgCO$_3$ added instead of MgO,
**O$_2$ sparged

TABLE 7

Rare Earth Carbonate Composition

| | Test ID | | | | |
|---|---|---|---|---|---|
| Wt % | C5 | C6 | C7 | C8 | C9 |
| La—Sm | 34 | 33 | 34 | 34 | 33 |
| Al | 5.9 | 5.7 | 5.9 | 5.8 | 5.7 |
| Fe | 0.8 | 0.7 | 0.7 | 0.8 | 0.8 |
| Ca | 0.9 | 0.8 | 0.5 | 0.8 | 0.9 |
| S | 0.8 | 1.6 | 1.4 | 0.8 | 1.9 |
| Mg | 0.5 | 0.9 | 0.2 | 0.4 | 1.1 |
| Th | 0.03 | 0.02 | 0.02 | 0.02 | 0.03 |

What is claimed is:

1. A process for recovering rare earth elements from a composite ore containing rare earth elements that includes a monazite group mineral and an apatite mineral, comprising:
   pre-leaching the composite ore with an acid so as to substantially dissolve the apatite mineral into a pre-leach liquor;
   precipitating rare earth elements from the pre-leach liquor;
   subjecting the residue of the pre-leaching step to an acid bake treatment, followed by a water leach, to produce a water leach liquor rich in rare earth elements;

separating impurities including thorium and iron from the water leach liquor by introducing a neutralizing additive to said water leach liquor rich in rare earth elements; and precipitating rare earth elements from a post-neutralization liquor.

2. A process according to claim 1 wherein the acid employed for the pre-leaching is nitric acid.

3. A process according to claim 2 wherein the initial concentration of the nitric acid is in the range 30 to 60 wt %.

4. A process according to claim 2 wherein the initial concentration of the nitric acid is in the range 40 to 50 wt %.

5. A process according to claim 1 wherein the acid employed for the pre-leaching is hydrochloric acid.

6. A process according to claim 5 wherein the concentration of the hydrochloric acid is in the range 10 to 40 wt %.

7. A process according to claim 5 wherein the initial concentration of the hydrochloric acid is in the range 20 to 30 wt %.

8. A process according to claim 1 wherein rare earth elements are precipitated from the pre-leach liquor as phosphates.

9. A process according to claim 8 wherein said precipitation of rare earth elements as phosphates from the pre-leach liquor is by addition of ammonia or hydrated lime.

10. A process according to claim 8 wherein the conditions of said precipitation of the rare earth elements from the pre-leach liquor are selected to recover, with the rare earth elements and in a form separable subsequently, a major proportion of thorium present in the pre-leach liquor from the composite ore.

11. A process according to claim 8 wherein the acid employed for the pre-leaching is nitric acid.

12. A process according to claim 8 wherein the acid employed for the pre-leaching is hydrochloric acid.

13. A process according to claim 1 wherein the conditions of said precipitation of the rare earth elements from the pre-leach liquor are selected to recover, with the rare earth elements and in a form separable subsequently, a major proportion of thorium present in the pre-leach liquor from the composite ore.

14. A process according to claim 1 wherein the apatite is a fluorapatite, and a fluoride component of the pre-leach liquor is removed by addition of a sodium salt to cause precipitation of the fluoride component.

15. A process according to claim 1 wherein said acid bake treatment is carried out in a rotary kiln.

16. A process according to claim 15 wherein said acid bake treatment is effected for between 1 and 3 hours.

17. A process according to claim 15 wherein said acid bake treatment is a sulphuric acid bake.

18. A process according to claim 17 wherein said acid bake treatment is effected at a temperature in the range 210-250° C.

19. A process according to claim 1 wherein said acid bake treatment is a sulphuric acid bake.

20. A process according to claim 19 wherein said acid bake treatment is effected at a temperature in the range 210-250° C.

21. A process according to claim 17 wherein the acid employed for the pre-leaching is nitric acid.

22. A process according to claim 17 wherein the acid employed for the pre-leaching is hydrochloric acid.

23. A process according to claim 1 wherein said thorium and iron separation is effected by neutralization with an alkali or alkaline earth additive selected to minimize rare earth co-precipitation or absorption.

24. A process according to claim 23 wherein said neutralizing additive is a magnesium compound.

25. A process according to claim 23 wherein a minimum Fe:P molar ratio of 1 is maintained in the water leach liquor feeding the neutralization in order to prevent rare earth loss to a solid residue by premature precipitation of rare earth phosphates.

26. A process according to claim 25 wherein said neutralizing additive is a magnesium compound.

27. A process according to any one of claim 17 wherein said thorium and iron separation is effected by neutralization with an alkali or alkaline earth additive selected to minimize rare earth co-precipitation or absorption.

28. A process according to claim 27 wherein said acid bake treatment is effected at a temperature in the range 210-250° C.

29. A process according to claim 27 wherein said neutralizing additive is a magnesium compound.

30. A process according to claim 27 wherein a minimum Fe:P molar ratio of 1 is maintained in the water leach liquor feeding the neutralization in order to prevent rare earth loss to a solid residue by premature precipitation of rare earth phosphates.

31. A process according to claim 1 wherein said precipitation of the rare earth elements from the post-neutralization liquor is by carbonate or double salt precipitation.

32. A process according to claim 31 wherein the rare earth carbonates or hydroxides resulting from said carbonate or double salt precipitation are leached to produce a composite rare earth chloride as an end-product.

33. A process according to claim 24 wherein said precipitation of the rare earth elements from the post-neutralization liquor is by carbonate or double salt precipitation.

34. A process according to claim 27 wherein said precipitation of the rare earth elements from the post-neutralization liquor is by carbonate or double salt precipitation.

35. A process according to claim 33 wherein the rare earth carbonates or hydroxides resulting from said carbonate or double salt precipitation are leached to produce a composite rare earth chloride as an end-product.

36. A process according to claim 34 wherein the rare earth carbonates or hydroxides resulting from said carbonate or double salt precipitation are leached to produce a composite rare earth chloride as an end-product.

37. A process according to claim 1 wherein a pre-leach acid addition is about 110% stoichiometric with respect to calcium.

38. A process for recovering rare earth elements from a composite ore containing rare earth elements that includes a monazite group mineral and an apatite mineral, comprising:
pre-leaching the composite ore with nitric or hydrochloric acid so as to substantially dissolve the apatite mineral into a pre-leach liquor, wherein the pre-leach acid addition is about 110% stoichiometric with respect to calcium;
precipitating rare earth elements and thorium from the pre-leach liquor;
subjecting the residue of the pre-leaching step to a sulphuric acid bake treatment in a rotary kiln at a temperature in the range of 210-250° C., followed by a water leach, to produce a water leach liquor rich in rare earth elements;
separating impurities including thorium and iron from the water leach liquor by introducing a neutralizing magnesium compound to said water leach liquor rich in rare earth elements, wherein a minimum Fe:P molar ratio of 1 is maintained in the water leach liquor feeding the neutralization in order to prevent rare earth loss to the solid residue by premature precipitation of rare earth phosphates; and
precipitating rare earth elements from a post-neutralization liquor.

* * * * *